(12) United States Patent
Suzuki et al.

(10) Patent No.: US 7,639,575 B2
(45) Date of Patent: Dec. 29, 2009

(54) RECORDING CONDITION SETTING METHOD, PROGRAM, RECORDING MEDIUM, AND INFORMATION RECORDING APPARATUS

(75) Inventors: Haruyuki Suzuki, Kanagawa (JP); Norihiro Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 528 days.

(21) Appl. No.: 10/641,067

(22) Filed: Aug. 15, 2003

(65) Prior Publication Data

US 2004/0037190 A1  Feb. 26, 2004

(30) Foreign Application Priority Data

Aug. 23, 2002  (JP)  ............................. 2002-243456

(51) Int. Cl.
G11B 7/12  (2006.01)

(52) U.S. Cl. .................... 369/47.5; 369/53.26; 369/116

(58) Field of Classification Search ........................ None
See application file for complete search history.

(56) References Cited

U.S. PATENT DOCUMENTS

| | | | |
|---|---|---|---|
| 5,218,588 A | 6/1993 | Suzuki | |
| 5,274,622 A * | 12/1993 | Kono | 369/116 |
| 5,309,418 A | 5/1994 | Suzuki | |
| 5,371,726 A | 12/1994 | Suzuki | |
| 5,375,108 A | 12/1994 | Suzuki | |
| 5,390,032 A | 2/1995 | Yamamoto et al. | |
| 5,442,607 A | 8/1995 | Suzuki | |
| 5,487,055 A | 1/1996 | Suzuki | |
| 5,521,892 A | 5/1996 | Suzuki | |
| 5,604,722 A | 2/1997 | Suzuki | |
| 5,631,886 A | 5/1997 | Suzuki | |
| 6,128,261 A | 10/2000 | Suzuki | |
| 6,333,903 B1 | 12/2001 | Suzuki | |
| 2001/0038587 A1 * | 11/2001 | Shumura et al. | 369/53.18 |
| 2002/0009030 A1 * | 1/2002 | Matsumoto et al. | 369/47.53 |
| 2002/0012296 A1 | 1/2002 | Suzuki | |
| 2002/0012297 A1 | 1/2002 | Suzuki | |
| 2002/0044507 A1 | 4/2002 | Hagiwara et al. | |
| 2002/0064114 A1 * | 5/2002 | Sakata et al. | 369/53.26 |
| 2003/0035354 A1 | 2/2003 | Suzuki | |
| 2003/0048713 A1 | 3/2003 | Suzuki | |
| 2003/0058765 A1 * | 3/2003 | Schreurs et al. | 369/47.53 |
| 2003/0156514 A1 * | 8/2003 | Suzuki | 369/47.53 |
| 2003/0156519 A1 * | 8/2003 | Yokoi | 369/59.11 |

FOREIGN PATENT DOCUMENTS

| | | |
|---|---|---|
| JP | 5-144061 | 6/1993 |
| JP | 6-76288 | 3/1994 |
| JP | 3035034 | 2/2000 |
| JP | 3089844 | 7/2000 |
| JP | 2001-297437 | 10/2001 |

* cited by examiner

Primary Examiner—Wayne R Young
Assistant Examiner—Lixi Chow
(74) Attorney, Agent, or Firm—Dickstein Shapiro LLP

(57) ABSTRACT

A recording condition setting method includes the steps of: a) obtaining identification information from an information recording medium; b) searching through a table including history information indicative of temperature information detected in the vicinity of a light source and corresponding optimum recording power; c) extracting history information corresponding to the identification information; d) detecting temperature information detected in the vicinity of the light source; e) acquiring an optimum recording power by referring to the temperature information detected in step d) and the history information extracted in step c); and f) setting the optimum recording power acquired in step e) as a recording condition.

42 Claims, 7 Drawing Sheets

FIG.4

| DISK ID | LIGHT SOURCE TEMPERATURE (°C) | OPTIMUM RECORDING POWER (mW) |
|---|---|---|
| 00000001 | 18 | 15 |
| 00000001 | 25 | 17 |
| 00000001 | 32 | 20 |
| 00000001 | 40 | 23 |
| 00000002 | 20 | 15 |
| 00000002 | 30 | 18 |

RECORDING CONDITION SETTING METHOD, PROGRAM, RECORDING MEDIUM, AND INFORMATION RECORDING APPARATUS

BACKGROUND OF THE INVENTION

1. Field of the Invention

The present invention generally relates to a recording condition setting method, program, recording medium, and information recording apparatus. More particularly, the present invention relates to a recording condition setting method for setting a recording condition when recording information to an information recording apparatus, a program used for a recording apparatus, a recording medium having the program recorded thereto, and a recording apparatus for recording information to a recording medium.

2. Description of the Related Art

Due to improvements made in the functions of personal computers in recent years, the personal computer has become able to handle audio-visual information such as music and images. Since audio-visual information contains a vast amount of data, optical disks such as CDs (Compact Disc), and DVDs (Digital Versatile Disc) have gained attention for use as information recording media. Furthermore, as the costs for such optical disks become lower, an optical disk apparatus has become widely employed as a personal computer peripheral serving as an information recording apparatus. The optical disk apparatus records and erases information by irradiating a fine spot of laser light to spiral or concentric tracks formed on a recording surface of an optical disk, and reproduces information according to the light reflected from the recording surface. The optical disk apparatus has an optical pickup unit arranged thereto for irradiating the laser light to the recording surface of the optical disk and also for receiving the light reflected from the recording surface.

Typically, the optical pickup unit includes, for example, a light source for irradiating a laser light of a prescribed irradiation power (output power), an optics system for guiding the laser light irradiated from the light source to a recording surface of an information recording medium and also for guiding the laser light reflected from the recording surface to a prescribed light receiving location, and a light receiving element positioned at the light receiving location.

Information is recorded in the optical disk according to the lengths and combination of marked areas (pits) and unmarked areas (space), which have different reflectivities. In recording the information in the optical disk, the irradiation power of the light source is controlled so that the marked areas and space areas may be formed at a prescribed location and thus with a prescribed length.

In a case of forming marked areas in a recordable type optical disk (hereinafter referred to as "dye type disk") which contains organic dye in a recording layer thereof, (e.g. CD-R (CD-recordable) disk, DVD-R (DVD-recordable) disk), a laser light with an increased irradiation power is applied to the dye type disk to heat and melt the dye, thereby transmuting or transforming a substrate portion contacting the area at which the laser light is applied. Meanwhile, in a case of forming space areas, the irradiation power of the laser light is reduced to a degree substantially equal to that during reproduction in order to prevent the substrate from transmuting and transforming. Therefore, the reflectivity of the marked areas is lower than that of the space areas.

Typically, the dye type disk exhibit significant changes in recording sensitivity in correspondence to changes in the wavelength of laser light. Therefore, changes in the wavelength of laser light will also change the optimum irradiation power when forming the marked areas (hereinafter referred to as "recording power"). Furthermore, changes in the temperature of the light source will change the wavelength of the laser light irradiated from the light source. That is, the optimum recording power will change in correspondence to a change in the temperature of the light source.

Accordingly, Japanese Laid-Open Patent Publication No. 2001-297437 (hereinafter referred to as "first conventional example"), for example, shows an optical recording apparatus having a temperature sensor disposed near an optical pickup unit, in which the temperature near the optical pickup unit is detected by the temperature sensor during a recording process. When the temperature surpasses a prescribed value, the optical recording apparatus performs a test-recording procedure for obtaining an optimum recording power, so-called OPC (Optimum Power Control) procedure.

In another example, Japanese Laid-Open Patent Publication No. 5-144061. (hereinafter referred to as "second conventional example") shows an irradiation power control apparatus in which the apparatus obtains the optimum recording power of a laser beam irradiated from a laser diode in accordance with an identification code of an optical disk, relates the temperature near the laser diode in correspondence to the obtained optimum recording power of the identification code, stores the temperature information in a memory, and controls the irradiation power of the laser diode according to the temperature information. The irradiation power control apparatus reads the identification code of the optical disk prior to recording in the optical disk, derives the temperature information corresponding to the identification code from the memory, and performs the OPC procedure when the difference in the value between the derived temperature and the temperature detected from a sensor disposed near the laser diode surpasses a prescribed value, to thereby obtain the optimum recording power.

In another example, Japanese Patent Laid-Open Publication No. 6-76288 (hereinafter referred to as "third conventional example") shows an optical disk apparatus in which the optical disk apparatus performs a running OPC procedure to enable correction of recording power. The optical disk apparatus first performs a standard OPC procedure to obtain the optimum recording power, and begins recording in accordance with the obtained optimum recording power. Subsequently, upon forming pits in an optical disk, the optical disk apparatus detects the intensity of the light reflected from the recording area and corrects the recording power based on the difference between a predetermined value and the value of the detected intensity.

Recordable type optical disks are formed with a test-recording area for determining optimum recording power. This area is called a "power calibration area (PCA)". For example, a CD-R has a PCA serving as a test-recording area divided into 100 partitions. Each of the partitions of the test-recording area is formed of 15 frames. Typically, a single partition is used for test-recording prescribed data in an optical disk where the test-recording is performed with a certain linear speed and where recording power for each frame is changed step by step. Accordingly, among the recording power level for each of the frames, the recording power displaying the highest recording quality is chosen as the optimum recording power. Nevertheless, since the optical recording apparatus of the first conventional example and the irradiation power control apparatus of the second conventional example both perform the OPC procedure whenever a value corresponding to temperature surpasses a prescribed value, both of the examples tend to face a problem of lacking the recording area sufficient for required test-recording. Furthermore, since the optical recording apparatus of the third conventional example always performs the OPC procedure prior to a recording procedure, the third example will also face the lack of sufficient test-recording area after repetitively recording small amounts of data.

SUMMARY OF THE INVENTION

It is a general object of the present invention to provide a recording condition setting method, program, recording medium, and information recording apparatus that substantially obviate one or more of the problems caused by the limitations and disadvantages of the related art.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a recording condition setting method, program, recording medium, and information recording apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a recording condition setting method, including the steps of: a) obtaining identification information from an information recording medium; b) searching through a table including history information indicative of temperature information detected in the vicinity of a light source and corresponding optimum recording power; c) extracting history information corresponding to the identification information; d) detecting temperature information detected in the vicinity of the light source; e) acquiring an optimum recording power by referring to the temperature information detected in step d) and the history information extracted in step c); and f) setting the optimum recording power acquired in step e) as a recording condition.

It is to be noted that the term "temperature information" is not limited to temperature itself, but may also include information changing in correspondence to change of temperature, and information convertible to temperature.

The recording condition setting method of the present invention may further include the steps of: g) determining whether the identification information is recorded in the information recording medium; h) creating new identification information when the identification information is not recorded in the information recording medium; and i) recording the new identification information in the information recording medium.

In the recording condition setting method of the present invention, step e) may further include a step of calculating with reference to the history information extracted in step c).

In the recording condition setting method of the present invention, the calculation may be an approximate calculation or an interpolation calculation.

The recording condition setting method of the present invention may further include the steps of: j) setting an effective temperature range according to the history information extracted in step c); k) determining whether the temperature information detected in step d) is included in the effective temperature range; l) acquiring another optimum recording power by test-recording in the information recording medium when the temperature information detected in step d) is not included in the effective temperature range; and m) setting the other optimum recording power as the recording condition.

The recording condition setting method of the present invention may further include a step of: n) adding the other optimum recording power to the table in correspondence with the temperature information detected in step d) and the identification information.

Another recording condition setting method of the present invention includes the steps of: a) acquiring an optimum recording power and temperature information corresponding to the optimum recording power; b) recording the optimum recording power and the temperature information in a memory; c) detecting temperature information of an information recording medium; d) determining whether the temperature information of the information recording medium matches the temperature information recorded in the memory; and e) setting an optimum recording power of the information recording medium as a recording condition when the temperature information of the information recording medium matches the temperature information recorded in the memory.

The recording condition setting method of the present invention may further include the steps of: f) estimating another optimum recording power when the temperature information of the information recording medium does not match with any temperature information recorded in the memory; and g) setting the other optimum recording power as the recording condition.

In the recording condition setting method of the present invention, the other optimum recording power in step f) may be estimated by an approximate calculation or an interpolation calculation with reference to the optimum recording power and the temperature information recorded in the memory.

The recording condition setting method of the present invention may further include a step of: h) adding the other optimum recording power to the memory in correspondence with the temperature information of the information recording medium and identification information of the information recording medium.

A program of the present invention includes the steps of: a) obtaining identification information from an information recording medium; b) searching through a table including history information indicative of temperature information detected in the vicinity of a light source and corresponding optimum recording power; c) extracting history information corresponding to the identification information; d) detecting temperature information detected in the vicinity of the light source; e) acquiring an optimum recording power by referring to the temperature information detected in step d) and the history information extracted in step c); and f) setting the optimum recording power acquired in step e) as a recording condition.

The program of the present invention may further include the steps of: g) determining whether the identification information is recorded in the information recording medium; h) creating new identification information when the identification information is not recorded in the information recording medium; and i) recording the new identification information in the information recording medium.

In the program of the present invention, step e) may further include a step of calculating with reference to the history information extracted in step c).

In the program of the present invention, the calculation may be an approximate calculation or an interpolation calculation.

The program of the present invention may further include the steps of: j) setting an effective temperature range according to the history information extracted in step c); k) determining whether the temperature information detected in step d) is included in the effective temperature range; l) acquiring another optimum recording power by test-recording in the information recording medium when the temperature information detected in step d) is not included in the effective temperature range; and m) setting the other optimum recording power as the recording condition.

The program of the present invention may further include a step of: n) adding the other optimum recording power to the table in correspondence with the temperature information detected in step d) and the identification information.

Another program of the present invention includes the steps of: a) acquiring an optimum recording power and temperature information corresponding to the optimum recording power; b) recording the optimum recording power and the temperature information in a memory; c) detecting temperature information of an information recording medium; d) determining whether the temperature information of the information recording medium matches the temperature information recorded in the memory; and e) setting an optimum recording power of the information recording medium as a recording condition when the temperature information of the information recording medium matches the temperature information recorded in the memory.

The program of the present invention may further include the steps of: f) estimating another optimum recording power when the temperature information of the information recording medium does not match with any temperature information recorded in the memory; and g) setting the other optimum recording power as the recording condition.

In the program of the present invention, the other optimum recording power in step f) may be estimated by an approximate calculation or an interpolation calculation with reference to the optimum recording power and the temperature information recorded in the memory.

The program of the present invention may further include a step of: h) adding the other optimum recording power to the memory in correspondence with the temperature information of the information recording medium and identification information of the information recording medium.

A recording medium of the present invention has a program recorded thereto, in which the program includes the steps of: a) obtaining identification information from an information recording medium; b) searching through a table including history information indicative of temperature information detected in the vicinity of a light source and corresponding optimum recording power; c) extracting history information corresponding to the identification information; d) detecting temperature information detected in the vicinity of the light source; e) acquiring an optimum recording power by referring to the temperature information detected in step d) and the history information extracted in step c); and f) setting the optimum recording power acquired in step e) as a recording condition.

In the recording medium of the present invention, the program recorded in the recording medium may further include the steps of: g) determining whether the identification information is recorded in the information recording medium; h) creating new identification information when the identification information is not recorded in the information recording medium; and i) recording the new identification information in the information recording medium.

In the recording medium of the present invention, step e) may further include a step of calculating with reference to the history information extracted in step c).

In the recording medium of the present invention, the calculation may be an approximate calculation or an interpolation calculation.

In the recording medium of the present invention, the program recorded in the recording medium may further include the steps of: j) setting an effective temperature range according to the history information extracted in step c); k) determining whether the temperature information detected in step d) is included in the effective temperature range; l) acquiring another optimum recording power by test-recording in the information recording medium when the temperature information detected in step d) is not included in the effective temperature range; and m) setting the other optimum recording power as the recording condition.

In the recording medium of the present invention, the program recorded to the recording medium may further include a step of: n) adding the other optimum recording power to the table in correspondence with the temperature information detected in step d) and the identification information.

In another recording medium of the present invention having a program recorded therein, the program recorded in the recording medium includes the steps of: a) acquiring an optimum recording power and temperature information corresponding to the optimum recording power; b) recording the optimum recording power and the temperature information in a memory; c) detecting temperature information of an information recording medium; d) determining whether the temperature information of the information recording medium matches the temperature information recorded in the memory; and e) setting an optimum recording power of the information recording medium as a recording condition when the temperature information of the information recording medium matches the temperature information recorded in the memory.

In the recording medium of the present invention, the program recorded in the recording medium may further include the steps of: f) estimating another optimum recording power when the temperature information of the information recording medium does not match with any temperature information recorded in the memory; and g) setting the other optimum recording power as the recording condition.

In the recording medium of the present invention, the other optimum recording power in step f) may be estimated by an approximate calculation or an interpolation calculation with reference to the optimum recording power and the temperature information recorded in the memory.

In the recording medium of the present invention, the program recorded in the recording medium may further include a step of: h) adding the other optimum recording power to the memory in correspondence with the temperature information of the information recording medium and identification information of the information recording medium.

An information recording apparatus of the present invention includes: a memory unit storing a table including history information indicative of temperature information detected in the vicinity of a light source and corresponding optimum recording power; a detecting unit detecting temperature information detected in the vicinity of the light source; an obtaining unit obtaining identification information from an information recording medium; an extracting unit extracting history information corresponding to the identification information by searching through the table; a setting unit acquiring an optimum recording power by referring to the temperature information detected by the detecting unit and the history information extracted by the extracting unit, and setting the acquired optimum recording power as a recording condition; and a recording unit recording information in the information recording medium according to the recording condition.

The information recording apparatus of the present invention may further include: a determining unit determining whether the identification information is recorded in the information recording medium; an identification information recording unit creating new identification information when the identification information is not recorded in the information recording medium, and recording the new identification information in the information recording medium.

In the information recording apparatus of the present invention, the setting unit may acquire the optimum recording power by calculating with reference to the history information extracted by the extracting unit.

In the information recording apparatus of the present invention, the calculation may be an approximate calculation or an interpolation calculation.

The information recording apparatus of the present invention may further include: a temperature range setting unit setting an effective temperature range according to the history information extracted by the extracting unit; another determining unit determining whether the temperature information detected by the detecting unit is included in the effective temperature range; another setting unit acquiring another optimum recording power by test-recording in the information recording medium when the temperature information detected by the detecting unit is not included in the effective temperature range, and setting the other optimum recording power as the recording condition.

In the information recording apparatus of the present invention, the other setting unit adds the other optimum recording power to the table in correspondence with the temperature information detected by the detecting unit and the identification information.

Another information recording apparatus of the present invention includes: an acquiring unit acquiring an optimum recording power and temperature information corresponding to the optimum recording power; a recording unit recording the optimum recording power and the temperature information in a memory unit; a detecting unit detecting temperature information of an information recording medium; a determining unit determining whether the temperature information of the information recording medium matches the temperature information recorded in the memory unit; and a setting unit setting an optimum recording power of the information recording medium as a recording condition when the temperature information of the information recording medium matches the temperature information recorded in the memory unit.

The information recording apparatus of the present invention may further include: another setting unit estimating another optimum recording power when the temperature information temperature information of the information recording medium does not match any temperature information recorded in the memory unit, and setting the other optimum recording power as the recording condition.

In the information recording apparatus of the present invention, the other optimum recording power is estimated by an approximate calculation or an interpolation calculation with reference to the optimum recording power and the temperature information recorded in the memory unit.

In the information recording apparatus of the present invention, the recording unit adds the other optimum recording power to the memory unit in correspondence with the temperature information of the information recording medium and identification information of the information recording medium.

In the information recording apparatus of the present invention, the memory unit is a memory having a non-volatile characteristic.

Accordingly, with the present invention, even when a light source temperature for recording information in an optical disk is different compared to a light source temperature obtained in a previously set recording condition, an optimum recording condition can be newly set without requiring writing in the test-recording area. In addition, since no test-recording is required, the time required for recording can be shortened. Furthermore, since recording power is acquired by referring to history information corresponding to each optical disk, a highly precise recording condition can be set. Accordingly, recording quality can be prevented from degrading, and a satisfactory recording quality can be obtained consistently.

Furthermore, even in a case where there is no history information corresponding to an optical disk, a highly precise recording power can be acquired.

Furthermore, with the present invention, precise recording power for recording information in an optical disk can be maintained.

Furthermore, with the present invention, precision of recording power based on the history information can be enhanced by adding history information to the temperature-power table.

Furthermore, since a vast amount of history information is stored in the flash memory, there is a high probability of being able to extract from the memory, a light source temperature matching with the detected light source temperature, and acquire the optimum recording power precisely.

Other objects and further features of the present invention will be apparent from the following detailed description when read in conjunction with the accompanying drawings.

BRIEF DESCRIPTION OF THE DRAWINGS

FIG. 4 shows one example of a temperature-power table stored in a flash memory;

DESCRIPTION OF THE PREFERRED EMBODIMENTS

In the following, embodiments of the present invention are described with reference to the accompanying drawings.

First Embodiment

With reference to FIGS. 1 through 6, an optical disk apparatus of the first embodiment is described below.

Figure 1:
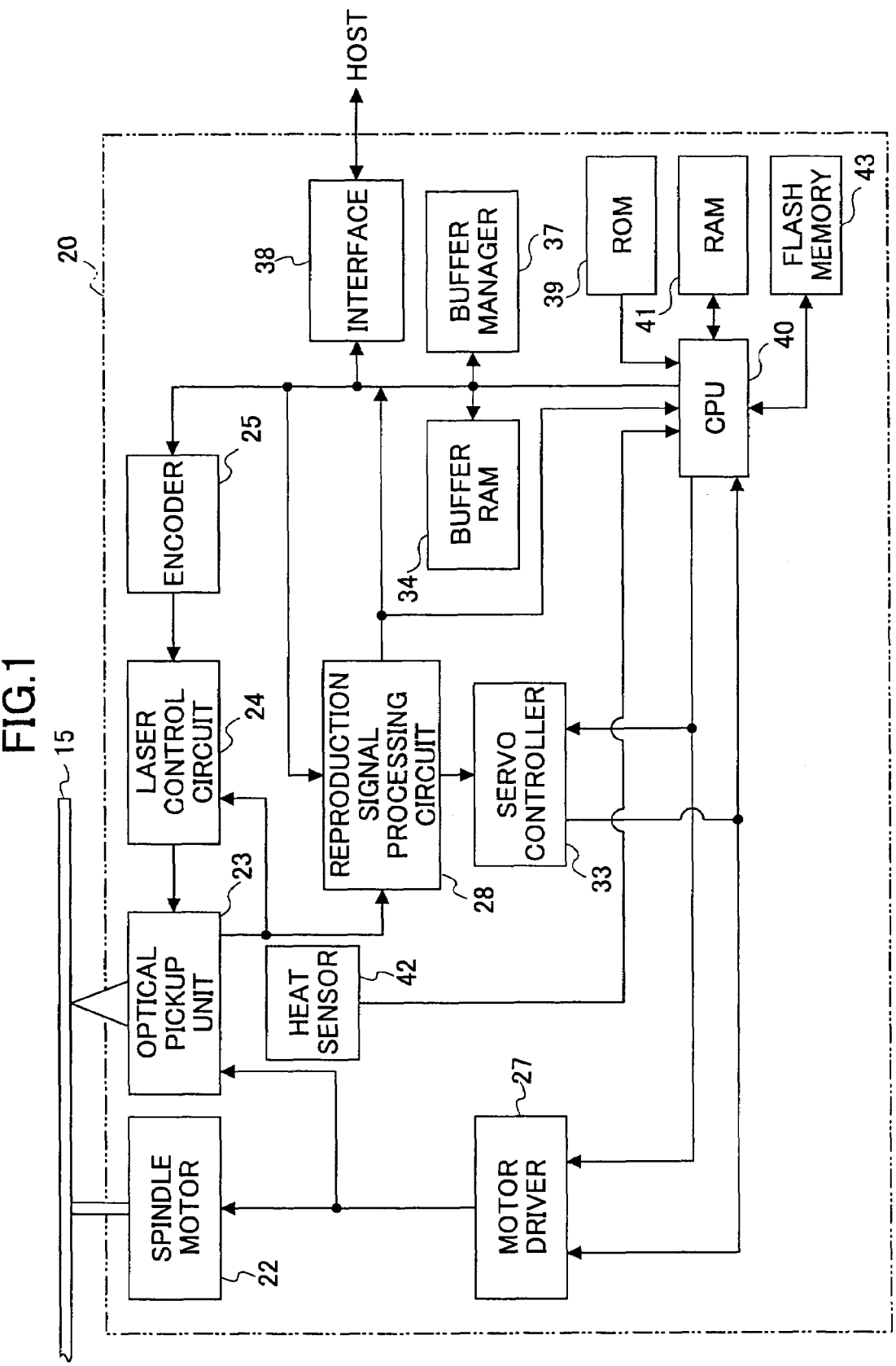
FIG. 1 is a block diagram showing an optical disk apparatus of the first embodiment of the present invention.
Figure 2:
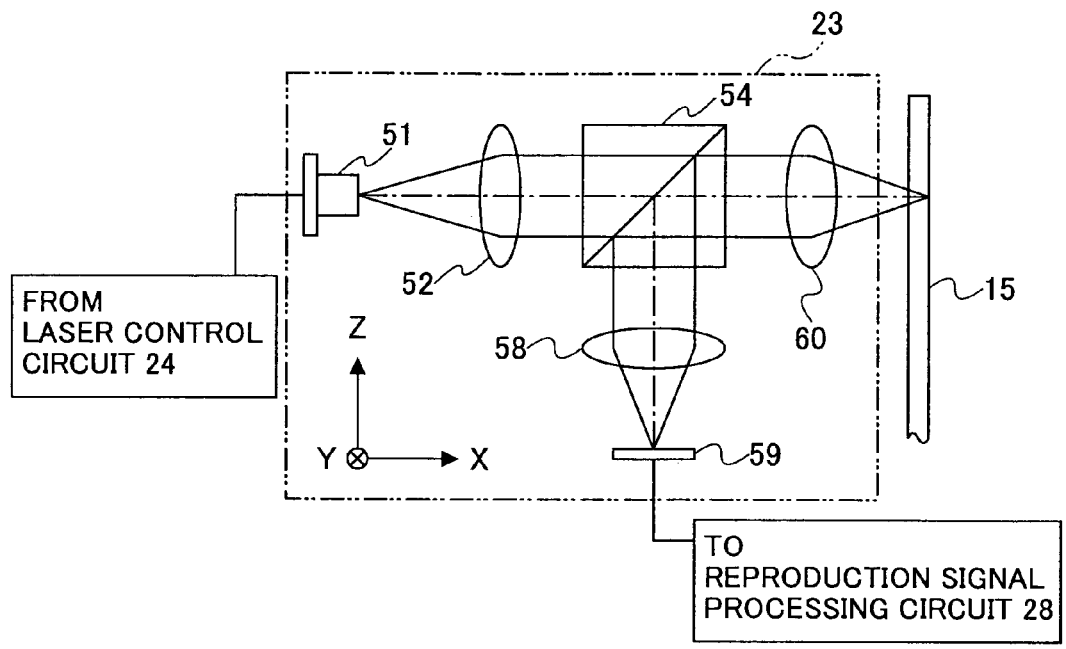
FIG. 2 is a block diagram for explaining an optical pickup unit in FIG. 1.

FIG. 1 is a block diagram showing an optical disk apparatus of the first embodiment of the present invention.

FIG. 1 shows an optical disk apparatus 20 that includes a spindle motor 22 for rotatatively driving an optical disk 15 serving as an information recording medium, an optical pickup unit 23, a laser control circuit 24, an encoder 25, a motor driver 27, a reproduction signal processing circuit 28, a servo controller 33, a buffer RAM 34, a buffer manager 37, an interface 38, a ROM 39, a CPU 40, a RAM 41, a flash memory 43 serving as a memory unit, and a temperature sensor 42 serving as a temperature detection unit. It is to be noted that the arrows shown in FIG. 1 merely indicate the flow of representative signals and information, and are not to be regarded as indicating all the relations among the blocks illustrated in FIG. 1.

The optical pickup unit 23 irradiates a laser light to a spiral or concentric tracks formed on a recording surface of the optical disk 15 and also receives light reflected from the recording surface. The optical pickup unit 23 includes, for example, a light source unit 51, a collimator lens 52, a beam splitter 54, an objective lens 60, a detection lens 58, a light receiving unit 59, and a drive system (not shown) that includes a focusing actuator, a tracking actuator, and a seek motor.

The light source unit 51 includes a semiconductor laser (not shown) that serves as a light source for irradiating a light beam of a prescribed wavelength. A monitor (not shown) detects the light quantity of the light beam irradiated from the light source unit 51 and sends irradiation signals indicative of the light quantity of the irradiated light to the laser control circuit 24 as feedback. In this embodiment, the irradiated light beam having the greatest intensity is irradiated in a direction referred to as "+X" direction (see FIG. 2). The collimator lens 52 is disposed on the "+X" side of the light source unit 51 for converting the irradiated light beam into a substantially parallel light (parallel light rays of the light beam).

The beam splitter 54 is disposed on the "+X" side of the collimator lens 52 for separating and guiding a light beam returning from the optical disk 15 in the "−Z" direction. The objective lens 60 is disposed on the "+X" side of the beam splitter for forming a light spot on the recording surface of the optical disk 15 by condensing a light beam transmitted through the beam splitter 54.

The detection lens 58 is disposed on the "−Z" side of the beam splitter 54 for condensing a returning (reflected) light beam separated by the beam splitter 54. The light receiving unit 59 is disposed on the "−Z" side of the detection lens 58. A four part light receiving element of a typical optical disk apparatus is employed as the light receiving element 59. As in any typical optical pickup unit, the light receiving element 59 receives light reflected from the recording surface of the optical disk 15, and outputs signals including, for example, wobble information, reproduction data, focus error information and track error information.

Thus structured, the function of the optical pickup unit 23 is briefly described next. First, the light beam irradiated from the light source unit 51 is converted into a substantially parallel light beam and becomes incident on the beam splitter 54. Then, the light beam transmitted through the beam splitter 54 is condensed by the objective lens 60, to thereby form a fine spot on the recording surface of the optical disk 15. Then, a reflected light returning as a light beam from the recording surface of the optical disk 15 is converted as a substantially parallel light beam by the objective lens 60 and becomes incident on the beam splitter 54. Then, the returning light beam is separated by the beam splitter 54 and is guided in the "−Z" direction. Then, the light receiving unit 59 receives the returning light beam via the detection lens 58. The light receiving unit 59 outputs a signal to the reproduction signal processing circuit 28 according to the received quantity of light.

With reference to FIG. 1, the reproduction signal processing unit 28 detects, for example, wobble signals, RF signals, and servo signals (focus error signals, tracking error signals) according to the signals output from the optical pickup unit 23. The reproduction signal processing unit 28 extracts, for example, address information and synchronization signals, from the wobble signals. The extracted address information is output to the CPU 40, and the synchronization signals are output to the encoder 25. After conducting, for example, an error correction process on the RF signals, the RF signals are stored in the buffer RAM 34 via the buffer manager 37. Furthermore, the reproduction signal processing circuit 28 detects asymmetric information and reflectivity information according to the RF signals, and outputs the detected results to the CPU 40. Meanwhile, it is to be noted that the reproduction signal processing circuit 28 outputs the servo signals to the servo controller 33.

The servo controller 33 generates a control signal for controlling a tracking actuator of the optical pickup unit 23 according to tracking error signals and outputs the control signal to the motor driver 27. The servo controller 33 also generates a control signal for controlling a focusing actuator of the optical pickup unit 23 according to focus error signals and outputs the control signal to the motor driver 27.

The motor driver 27 controls the tracking actuator and the focusing actuator of the optical pickup unit 23 according to the control signals from the servo controller 33. That is, the motor driver 27 performs tracking control and focus control. The motor driver 27 also controls the spindle motor 22 and the seek motor of the optical pickup 23 according to orders from the CPU 40.

The buffer manager 37 manages output and input data from/to the buffer RAM 34 and serves to inform the CPU 40 when the amount of data stored in the buffer RAM 34 is a prescribed value.

The encoder 25, in accordance with the orders from the CPU 40, obtains the data stored in the buffer RAM 34 via the buffer manager 37, conducts a process, for example, an addition of error correction codes, and generates writing signals for writing in the optical disk 15. Then, the encoder 25 synchronizes in accordance with the synchronization signals from the reproduction signal processing circuit 28 and outputs the writing signals to the laser control circuit 24.

Figure 3:
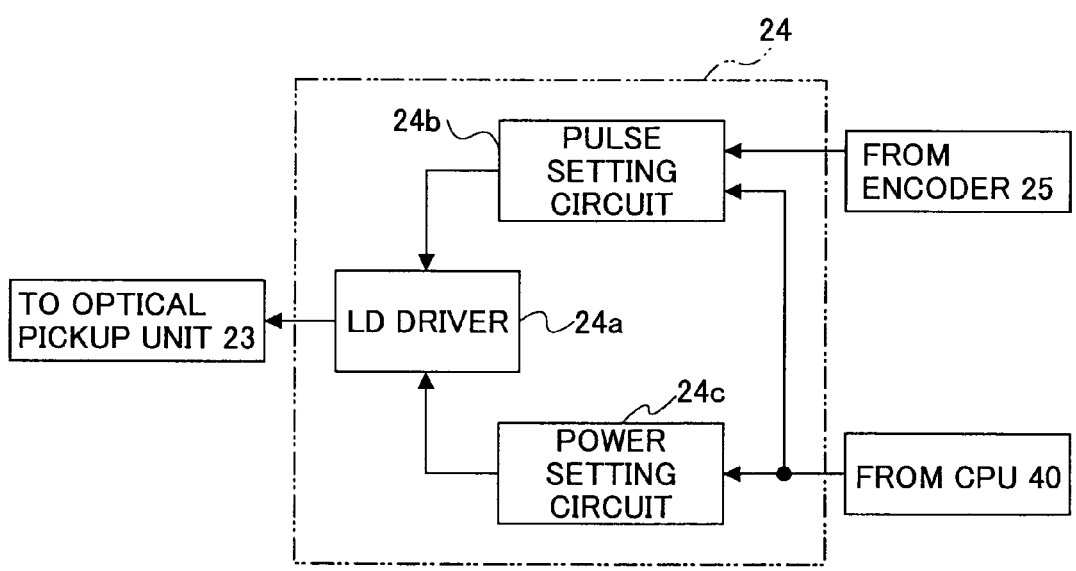
FIG. 3 is a block diagram of a laser control circuit in FIG. 1.

With reference to FIG. 3, the laser control circuit 24 includes, for example, an LD driver 24a, a pulse setting circuit 24b, and a power setting circuit 24c. The pulse setting circuit 24b, in accordance with the orders from the CPU 40, regulates the starting edge of the writing signals output from the encoder 25 and changes the pulses thereof. The power setting circuit 24c, in accordance with the orders from the CPU 40, sets the recording power for performing a recording procedure. The LD driver 24a controls the output of the semiconductor laser from the optical pickup unit 23 according to the writing signals regulated by the pulse setting circuit 24b and the recording power set by the power setting circuit 24c. The LD driver 24a controls the output of the semiconductor laser according to the feedback of the irradiation signals from the monitor (not shown).

With reference to FIG. 1, the interface 38 is a communication interface that is interactive with a host such as a personal computer. The interface 38 conforms to standard interfaces such as ATAPI (AT Attachment Packet Interface) and SCSI (Small Computer System Interface).

The temperature sensor 42 disposed in the vicinity of the light source unit 51 obtains temperature information near the light source unit 51 and outputs the obtained information to the CPU 40.

The ROM 39 has programs stored therein written in a code decodable by the CPU 40 and employed during a process of setting an optimum recording condition according to the temperature in the vicinity of the light source unit 51 (hereinafter referred to as "first recording condition setting program"). It is to be noted that the program stored in the ROM 39 is loaded into a main memory of the CPU 40 (not shown) when the optical disk apparatus 20 is switched on.

The flash memory 43 is stored with a calculation table indicative of temperature and the results obtained from the temperature sensor 42. The CPU 40 refers to the calculation table and obtains the temperature in the vicinity of the light source according to the results obtained from the temperature sensor 42 (hereinafter referred to as "light source temperature"). With reference to FIG. 4, the flash memory 43 may store a table, for example, including history information indicative of the relation between light source temperature and recording power in correspondence to each type of optical disk (hereinafter referred to as "temperature-power table"), which may be used as a database. In this embodiment, each history includes, for example, three fields which are disk ID, light source temperature, and optimum recording power. The disk ID is identification information provided to each optical disk used for classification of optical disks. In this embodiment, an eight digit number is employed as the disk ID. The flash memory 43 is a non-volatile memory, so that contents stored in the memory will not be erased even when there is no electric power supply.

Figure 5:
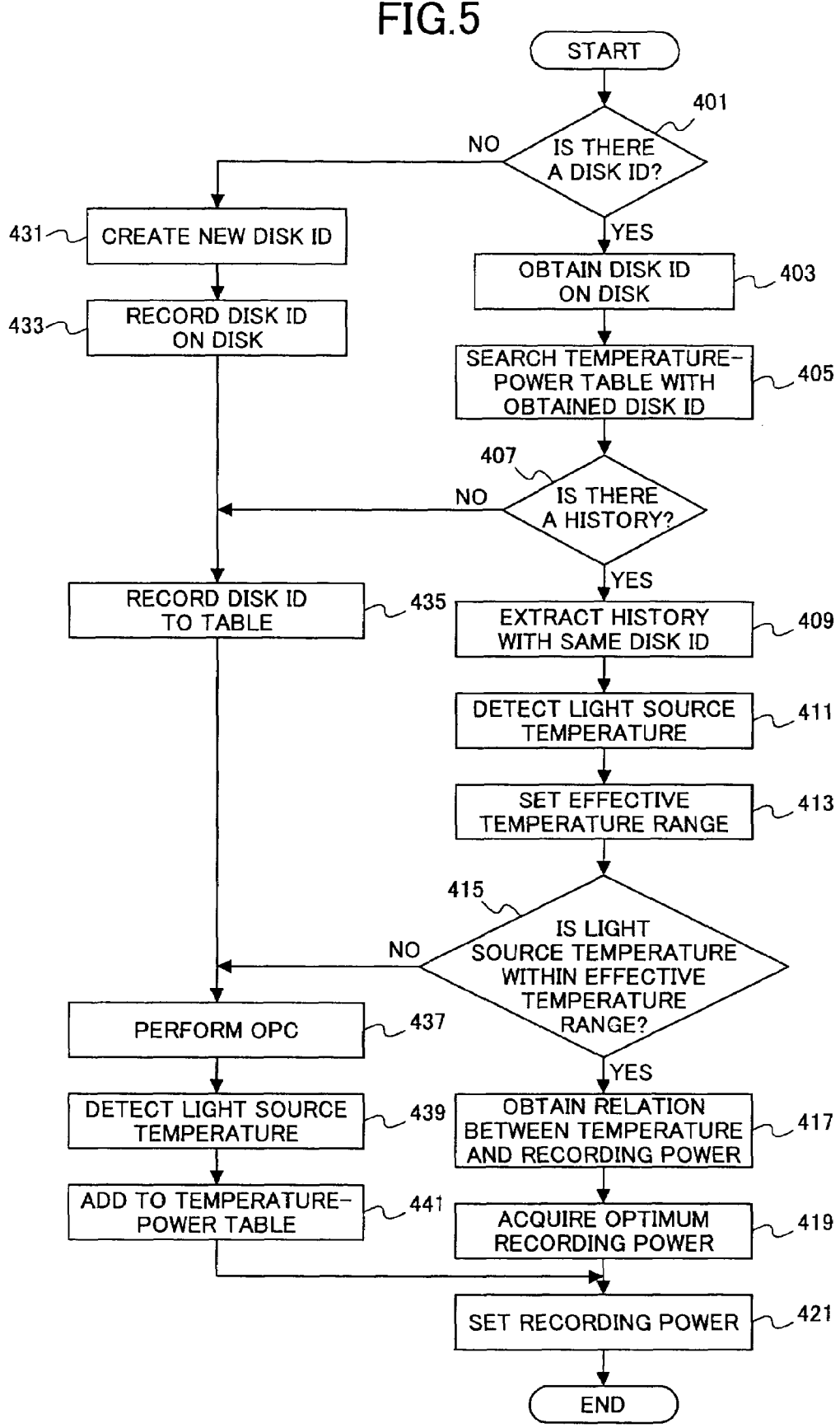
FIG. 5 is a flow chart for explaining a process of setting recording conditions according to the first embodiment of the present invention.
Figure 6:
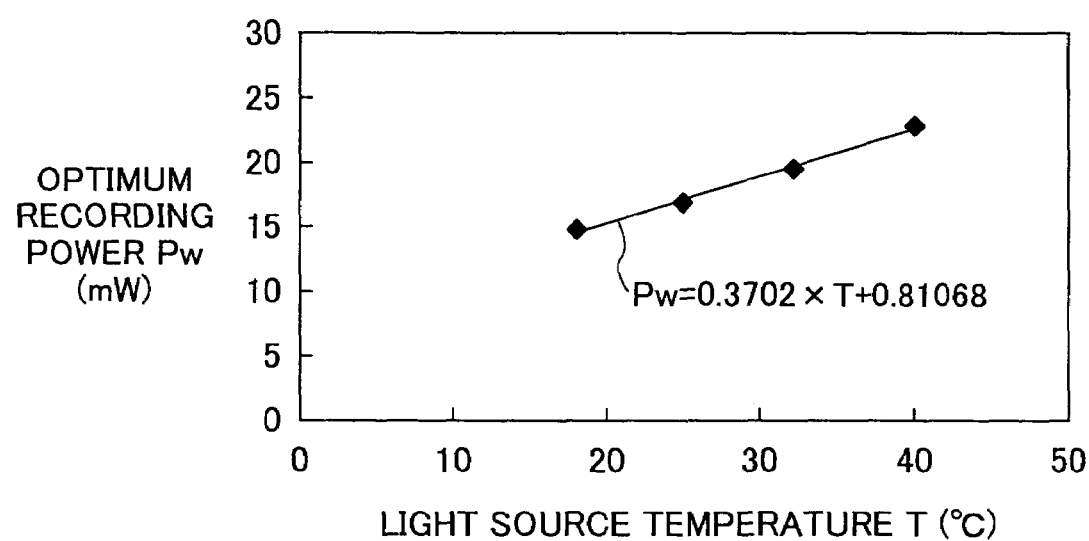
FIG. 6 is a diagram for explaining a relation between temperature of a light source and optimum recording power.

Next, a process of setting an optimum recording condition (hereinafter referred to as "recording power setting process") with the optical disk apparatus 20 will be described with reference to FIG. 5. The flow chart in FIG. 5 corresponds to a set of algorithms performed by the CPU 40. For example, upon receiving a command from a host for conducting a recording procedure, the top address of a program corresponding to the flow chart of FIG. 5 is set to a program counter of the CPU 40, to thereby start the recording power setting process.

First, in step 401, the CPU 40 determines whether the disk ID is recorded in a prescribed location of the optical disk 15. If the determination of the CPU 40 is affirmative, that is, if the disk ID is recorded in the optical disk 15, the recording power process moves to step 403.

In step 403, the CPU 40 reads out the disk ID from the prescribed location in the optical disk 15 at which the disk ID is recorded. For example, in this embodiment, "00000001" is obtained as the disk ID.

In step 405, using the obtained disk ID as a key, the CPU 40 searches the temperature-power table stored in the flash memory 43 for obtaining history information corresponding to the obtained disk ID.

In step 407, the CPU 40 determines whether there is a history corresponding to the obtained disk ID in the temperature-power table. In this embodiment, the CPU 40 makes an affirmative determination since histories corresponding to the obtained disk ID ("00000001") are included in the temperature-power table shown in FIG. 4, thereby proceeding to step 409.

In step 409, the CPU 40 extracts all of the histories corresponding to the obtained disk ID from the temperature-power table (in this embodiment, four histories are extracted).

Next, in step 411, the CPU 40 detects a light source temperature according to a signal output from the temperature sensor 42.

Next, in step 413, the CPU 40 sets an effective temperature range. In this embodiment, the effective temperature range extends from "minimum value of the light source temperature −5° C." to "maximum value of the light source temperature+ 5° C." (in this embodiment, from (18−5=13° C.) to (40+ 5=45° C.).

In step 415, the CPU 40 determines whether the obtained light source temperature is included within the effective temperature range. If the determination of the CPU 40 is affirmative, that is, if the obtained light source temperature is included within the effective temperature range, the CPU 40 proceeds to step 417.

In step 417, the CPU 40 obtains a relation between light source temperature and optimum recording power according to the histories extracted from the temperature-power table. In this embodiment, for example, the CPU 40 obtains an approximate expression indicating a correlation between the light source temperature and optimum recording power by using a least squares method. In this embodiment, the table in FIG. 4 shows that the optimum recording power is 15 mW when the light source temperature is 18° C., the optimum recording power is 17 mW when the light source temperature is 25° C., the optimum recording power is 20 mW when the light source temperature is 32° C., and the optimum recording power is 23 mW when the light source temperature is 40° C. Accordingly, the relation between the light source temperature and optimum recording power may be expressed with an approximate expression (1) described below and shown in FIG. 6.

$$Pw = 0.3702 \times T + 8.1068 \tag{1}$$

Next, in step 419, the CPU 40 applies the detected light source temperature to the approximate expression (1), to thereby obtain the optimum recording power corresponding to the detected light source temperature. For example, according to the approximate expression (1), the optimum recording power would be 12.92 mW when the detected light source temperature is 13° C.

In step 421, the obtained optimum recording power is output to the power setting circuit 24c, thereby setting recording power and finishing the recording power setting process.

Meanwhile, in step 401, if there is no disk ID recorded in the optical disk 15, the CPU 40 makes a negative determination and proceeds to step 431.

In step 431, the CPU 40 creates a new disk ID by providing the disk with, for example, a random number.

Next, in step 433, the CPU 40 records the newly created disk ID at a prescribed location in the optical disk 15.

Next, in step 435, the CPU 40 adds the newly created disk ID to a new history in the temperature-power table.

Next, in step 437, the CPU 40 performs the OPC procedure. That is, prescribed data are test-recorded in the PCA of the optical disk 15 at a prescribed linear speed while recording power is changed in a step by step manner; then, the data are reproduced successively, and then, a highest recording quality state, wherein the asymmetric value detected from the reproduced RF signals that relatively matches with a target value obtained by experiments and the like, is determined. Accordingly, the recording power during the highest recording quality state is defined as the optimum recording power. In addition, reflectivity during the highest recording quality state is detected and stored, together with a corresponding disk ID, in the flash memory 43 to be used as the target reflectivity.

Next, in step 439, the CPU 40 detects the light source temperature according to output signals from the temperature sensor 42.

In step 441, the CPU 40 records the detected light source temperature and the optimum recording power obtained by the OPC procedure in the temperature-power table in correspondence to the disk ID. That is, the detected light source temperature, the optimum recording power and the disk ID are added to the history information as a new history. During this procedure, it may be preferable to sort the histories of the history information according to, for example, light source temperature, for enabling easier use of the history information. After step 441, the CPU 40 proceeds to step 421.

It is to be noted that if no history corresponding to the disk ID is found in step 407, the CPU 40 makes a negative determination and proceeds to step 435.

It is also to be noted that if the detected light source temperature is not included in the effective temperature range (in this embodiment, 13° C. to 45° C.) in step 415, the CPU 40 does not obtain the relation between light source temperature and optimum recording power according to the histories extracted from the temperature-power table. Accordingly, the CPU 40 makes a negative determination and proceeds to step 437.

Meanwhile, after the optimum recording power is determined, a recording process is started for allowing data from the host to be recorded in a prescribed recording area of the optical disk 15.

Next, a recording process of the optical disk apparatus 20 is briefly described.

The CPU 40 outputs control signals to the motor driver 27 for controlling the rotation of the spindle motor 22 at a prescribed recording speed. In addition, the CPU 40 also reports the receipt of recording commands from the host to the reproduction signal processing circuit 28. The CPU 40 stores the received data from the host in the buffer RAM 34 via the buffer manager 37.

When the rotation of the optical disk 15 reaches a prescribed linear speed, the reproduction signal processing circuit 28 detects tracking error signals and focus error signals according to the signals output from the light receiving unit 59, and sends the detected signals to the servo controller 33.

In accordance with the tracking error signals, the servo controller 33, using the motor driver 27, drives the tracking actuator of the optical pickup unit 23 for correcting track deviation. Furthermore, in accordance with the focus error signals, the servo controller 33, using the motor driver 27, drives the focusing actuator of the optical pickup unit 23 for focus correction. In other words, the servo controller 33 performs tracking control and focus control.

The reproduction signal processing circuit 28 obtains address information based on the signals output from the optical pickup unit 23, and sends the obtained address information to the CPU 40. Then, in accordance with the address information, the CPU 40 sends a control signal to the motor driver 27, to thereby enable the seek motor of the optical pickup unit 23 to position the optical pickup unit 23 at a prescribed location for starting a writing procedure.

Then, upon receiving a notice from the buffer manager 37 that the amount of data stored in the buffer RAM 34 has surpassed a prescribed value, the CPU 40 commands the encoder 25 to create writing signals. Furthermore, after the CPU 40 confirms that the optical pickup unit 23 is positioned at the prescribed location for starting the writing procedure, the CPU 40 informs the encoder 25 that the optical pickup unit 23 is in the prescribed location. Accordingly, the encoder 25 records the writing signals in the optical disk 15 through use of the laser control circuit 24 and the optical pickup unit 23.

Next, a reproduction process of the optical disk apparatus 20 is briefly described.

When the CPU 40 receives a command from the host requesting the reproduction process, the CPU 40 outputs control signals to the motor driver 27 for controlling the rotation of the spindle motor 22 at a prescribed reproduction speed. In addition, the CPU 40 also reports the receipt of reproduction commands from the host to the reproduction signal processing circuit 28. When the rotation of the optical disk 15 reaches a prescribed linear speed, tracking control and focus control are started. Furthermore, the reproduction signal processing circuit 28 detects address information and reports the address information to the CPU 40.

In accordance with the address information, the CPU 40 sends a control signal to the motor driver 27, to thereby enable the seek motor of the optical pickup unit 23 to position the optical pickup unit 23 at a prescribed location for starting a reading procedure. After the CPU 40 confirms that the optical pickup unit 23 is positioned at the prescribed location for starting the reading procedure, the CPU 40 informs the reproduction signal processing circuit 28 that the optical pickup unit 23 is in the prescribed location.

Then, the reproduction signal processing unit 28 detects RF signals from the signals output from the light receiving unit 59. After conducting, for example, an error correction process on the RF signals, the RF signals are stored in the buffer RAM 34. When reproduction data are completely stored in the buffer RAM as sector data, the buffer manager 37 sends the reproduction data to the host via the interface 38.

It is to be noted that the tracking control and the focus control are continued until the reproduction process is completed.

As described above, by employing the CPU 40 and executing the program with the CPU 40, the optical disk apparatus of this embodiment is able to provide an identification information obtaining unit, a history information extracting unit, a first determining unit, an identification information recording unit, a temperature range setting unit, a second deciding unit, a first setting unit, and a second setting unit. That is, with reference to FIG. 5, step 403 may serve as the identification information obtaining unit, steps 405 to 409 may serve as the history information extracting unit, step 401 may serve as the first determining unit, step 431 and step 433 may serve as the identification information recording unit, step 413 may serve as the temperature range setting unit, step 415 may serve as the second determining unit, steps 417 to 421 may serve as the first setting unit, and steps 437 to 441 and step 421 may serve as the second setting unit. Nevertheless, the present invention is not limited to this embodiment. For example, all of or at least part of the foregoing steps performed by the CPU 40 using the program may be provided in the form of hardware.

In this embodiment, among the programs stored in the ROM 39, the program serving to perform the steps shown in the flow chart in FIG. 5 signifies the first recording condition setting program.

With reference to FIG. 5, step 403 is included in step a) described in claim 1, steps 405 through 409 are included in steps b) and c) described in claim 1, step 411 is included in step d) described in claim 1, and steps 417 through 421 are included in steps e) and f) described in claim 1. Furthermore, step 401 is included in step g) described in claim 2, and steps 431 and 433 are included in steps h) and i) described in claim 2. Furthermore, step 413 is included in step j) described in claim 5, step 415 is included in step k) described in claim 5, and steps 437, 439 and 421 are included in steps l) and m) described in claim 5. Furthermore, step 441 is included in step n) described in claim 6.

Accordingly, as described above, the optical disk apparatus and the recording condition setting method of this first embodiment are able to set a recording condition in which the recording power is acquired by obtaining a disk ID, then searching through a temperature-power table according to the disk ID, then extracting history information corresponding to the disk ID according to the search, then detecting a light source temperature, and then relating the detected light source temperature with the obtained history information. Therefore, even when a light source temperature for recording information in an optical disk is different compared to a light source temperature obtained in a previously set recording condition, an optimum recording condition can be newly set without requiring the use of a test-recording area. In addition, since no test-recording is required, the time required for recording can be shortened. Furthermore, since recording power is acquired by referring to history information corresponding to each type of optical disk, a highly precise recording condition can be set. Accordingly, recording quality can be prevented from degrading, and a satisfactory recording quality can be obtained consistently.

Furthermore, with the first embodiment, an approximate expression indicative of a relation between light source temperature and optimum recording power can be obtained, in accordance with histories extracted from a temperature-power table, by using a least squares method. Then, a detected light source temperature is applied to the approximate expression, to thereby acquire an optimum recording power corresponding to the detected light source temperature. Therefore, even in a case where there is no history information corresponding to an optical disk, a highly precise recording power can be acquired.

Furthermore, with the first embodiment, prior to acquiring an optimum recording power, an effective temperature range is set according to extracted history information. Then, whether or not a detected light source temperature is included within the effective temperature range is determined. If it is determined that the detected light source temperature is not included within the effective temperature range, an OPC procedure is performed to thereby acquire an optimum recording power and set the acquired optimum recording power as a recording power employed for recording information in an optical disk. Accordingly, a precise recording power for recording information in an optical disk can be maintained. Therefore, recording quality can be prevented from degrading, and a satisfactory recording quality can be obtained consistently.

Furthermore, with the first embodiment, in a case where an OPC procedure is performed, history information indicative of a relation between an optimum recording power obtained from the OPC procedure, a detected light source temperature, and a disk ID is added to the temperature-power table. By adding history information to the temperature-power table, precision of recording power based on the history information can be enhanced.

Furthermore, with the optical disk apparatus of the first embodiment, recording can be performed steadily with excellent recording quality since an optimum recording power corresponding to light source temperature is obtained when setting a recording condition.

Although each history in the temperature-power table of the first embodiment is formed of three fields (disk ID, light source temperature, and optimum recording power), it is to be noted that other fields (e.g. date when data were obtained, recording speed) may also be added to each history.

Although a single temperature-power table is employed in the first embodiment, more tables may be employed, for example, temperature-power tables corresponding to each optical disk manufacturer or supplier, in which each of the tables is formed of three fields including disk ID, light source temperature, and optimum recording power. This enables history information to be searched more easily.

Although the first embodiment employs eight digit numbers as the disk IDs, the numbers are not to be limited to eight digits. Moreover, alphabet letters, symbols, or numerals, for example, may be employed independently or in combination with each other.

Although the first embodiment employs disk ID as identification information for identifying an optical disk, manufacturer information, for example, may also be employed.

Although the first embodiment approximates a relation between light source temperature and optimum recording power with use of a linear expression, a polynomial expression may also be used. Furthermore, an interpolation expression may be used instead of an approximate expression. In other words, the expression used for obtaining an optimum recording power corresponding to a detected light source temperature is not to be limited in particular, as long as the optimum recording power can be obtained precisely.

Furthermore, with the first embodiment, a relation between a light source temperature and an optimum recording power is obtained whenever a recording condition is to be set. It is, however, not requisite to obtain the relation whenever the recording condition is to be set. For example, a relation between a light source temperature and an optimum recording power may be obtained beforehand upon obtaining new history information and a recording condition may be set in accordance with the relation obtained beforehand. Thereby, processing time can be saved.

Although the first embodiment records the first recording condition setting program in the ROM 39, the program may be recorded in other recording media (e.g. CD-ROM, optic-magneto disk, flash memory, flexible disk). In this case, a drive apparatus corresponding to each recording medium may be provided for allowing the program to be installed from the respective drive apparatus. In other words, it is not required to record the first recording condition setting program in the ROM 39, as long as the program is loaded in the main memory of the CPU 40 for execution.

It is to be noted that, for example, the process for obtaining the disk ID may be omitted in a case where the type of optical disk is limited. This case is described in the second embodiment given below.

Second Embodiment

A second embodiment of the present invention is next described with reference to FIGS. 7 and 8.

The second embodiment has a feature of employing a method for setting an optimum recording condition which is different from that of the first embodiment. Other components (e.g. optical pickup unit, optical disk apparatus) are the same as the first embodiment. Therefore, mainly the differences between the second embodiment and the first embodiment are hereinafter described. Furthermore, like components of the second and first embodiments are denoted by like numerals and are not further described. Furthermore, the second embodiment is provided under the same conditions as those of the first embodiment.

ROM 39 has stored a second recording condition setting program instead of the first recording condition setting program.

A process for setting recording power is next described with reference to FIG. 7. The flow chart in FIG. 7 corresponds to a set of algorithms performed by the CPU 40.

First, in step 501, the CPU 40 detects light source temperature according to a signal output from the temperature sensor 42.

In step 503, using the detected light source temperature as a key, the CPU 40 searches the temperature-power table stored in the flash memory 43 and determines whether a history with a light source temperature the same as that of the detected light source temperature exists. If the history exists, the CPU 40 makes an affirmative determination, and proceeds to step 505.

In step 505, the CPU 40 extracts all of the histories having light source temperatures that are the same as the detected light source temperature.

In step 507, the CPU 40 acquires an optimum recording power from the extracted histories.

In step 509, the CPU 40 outputs the acquired optimum recording power to the power setting circuit 24c. After the acquired optimum recording power is output to the power setting circuit 24c, the recording power setting process is finished.

Meanwhile, in step 503, if there is no history with a light source temperature that is the same as the detected light source temperature, the CPU 40 makes a negative determination and proceeds to step 521.

In step 521, an approximate expression indicating a relation between light source temperature and optimum recording power is obtained, in accordance with history information recorded in the temperature-power table, by using, for example, a least squares method. It is to be noted that an interpolation expression, for example, may be used instead of the approximate expression. In other words, as long as an optimum recording power corresponding to the detected light source temperature can be obtained precisely, the expression used is not particularly limited.

In step 523, the CPU 40 applies the detected light source temperature to the approximate expression, to thereby acquire the optimum recording power corresponding to the detected light source temperature. Then, the CPU 40 proceeds to step 509.

After the optimum recording power is acquired, a process of recording data from the host to a prescribed recording area of the optical disk 15 is performed. Along with this recording process, a recording power correction process is also performed. The recording power correction process is next described with reference to FIG. 8. The flow chart in FIG. 8 corresponds to a set of algorithms performed by the CPU 40. Upon starting the recording process, the top address of a program corresponding to the flow chart of FIG. 8 is set to a program counter of the CPU 40, to thereby start the recording power correction process. It is to be noted that a target reflectivity detected beforehand during an OPC procedure is stored in the flash memory 43.

First, in step 601, the CPU 40 determines whether the recording of data is finished. When the CPU 40 determines that the recording of data is not finished, the CPU 40 makes a negative determination and proceeds to step 603.

In step 603, the CPU 40, using the reproduction signal processing circuit 28, detects reflectivity of an area of the optical disk 15 in which data are recorded.

In step 605, the CPU 40 determines whether correction of recording power is required by comparing the detected reflectivity and the target reflectivity already stored in the flash memory 43. In this case, when the difference between the detected reflectivity and the target reflectivity is greater than a prescribed value, the CPU 40 determines that this result requires correction of recording power, concludes this result as affirmative, and proceeds to step 607.

In step 607, the CPU 40 corrects the recording power so as to match the detected reflectivity with the target reflectivity and outputs the corrected recording power to the power setting circuit 24c. It is to be noted that a relation between the said difference and the degree of correcting the recording power is obtained beforehand through experiments and the like, and that the obtained relation is stored in the flash memory 43.

In step 609, a light source temperature is detected according to a signal output from the temperature sensor 42.

Next, in step 611, the detected light source temperature, the corrected recording power and disk ID are added to the temperature-power table. After the detected light source temperature, the corrected recording power and disk ID are added to the temperature-power table, the CPU 40 returns to step 601. By adding the detected light source temperature, the corrected recording power and disk ID to the temperature-power table, the amount of history information is increased. It is to be noted that the detected reflectivity may also be added to the history information.

Meanwhile, when the difference between the detected reflectivity and the target reflectivity is no more than the prescribed value, the CPU 40 determines that this result requires no correction of recording power, concludes this result as negative, and returns to step 601.

Furthermore, when the CPU 40 determines that the recording of data is finished, the CPU 40 concludes this result as affirmative and finishes the recording power correction process.

As described above, by employing the CPU 40 and executing the second condition setting program in the CPU 40, the optical disk apparatus of the second embodiment is able to provide a history acquiring unit, a history recording unit, a determining unit, a first recording power setting unit, and a second recording power setting unit. That is, with reference to FIGS. 7 and 8, steps 603, 607 and 609 may serve as the history acquiring unit, step 611 may serve as the history recording unit, steps 501 and 503 may serve as the determining unit, steps 505, 507 and 509 may serve as the first recording power setting unit, and steps 521, 523 and 509 may serve as the second recording power setting unit. Thus structured, a recording process and a reproduction process may be performed in the same manner as in the first embodiment.

Figure 7:
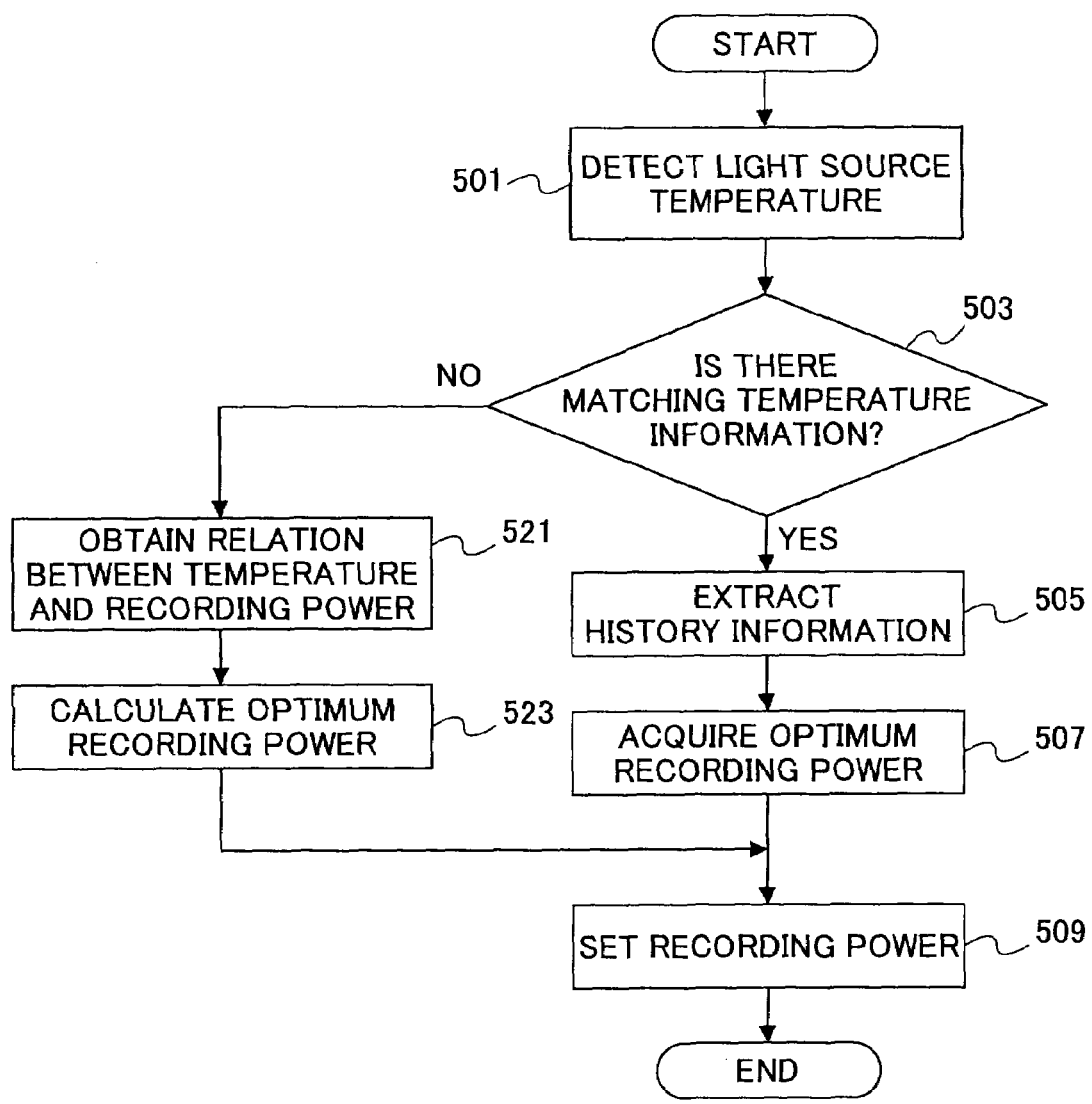
FIG. 7 is a flow chart for explaining a process of setting recording conditions (part 1) according to the second embodiment of the present invention.
Figure 8:
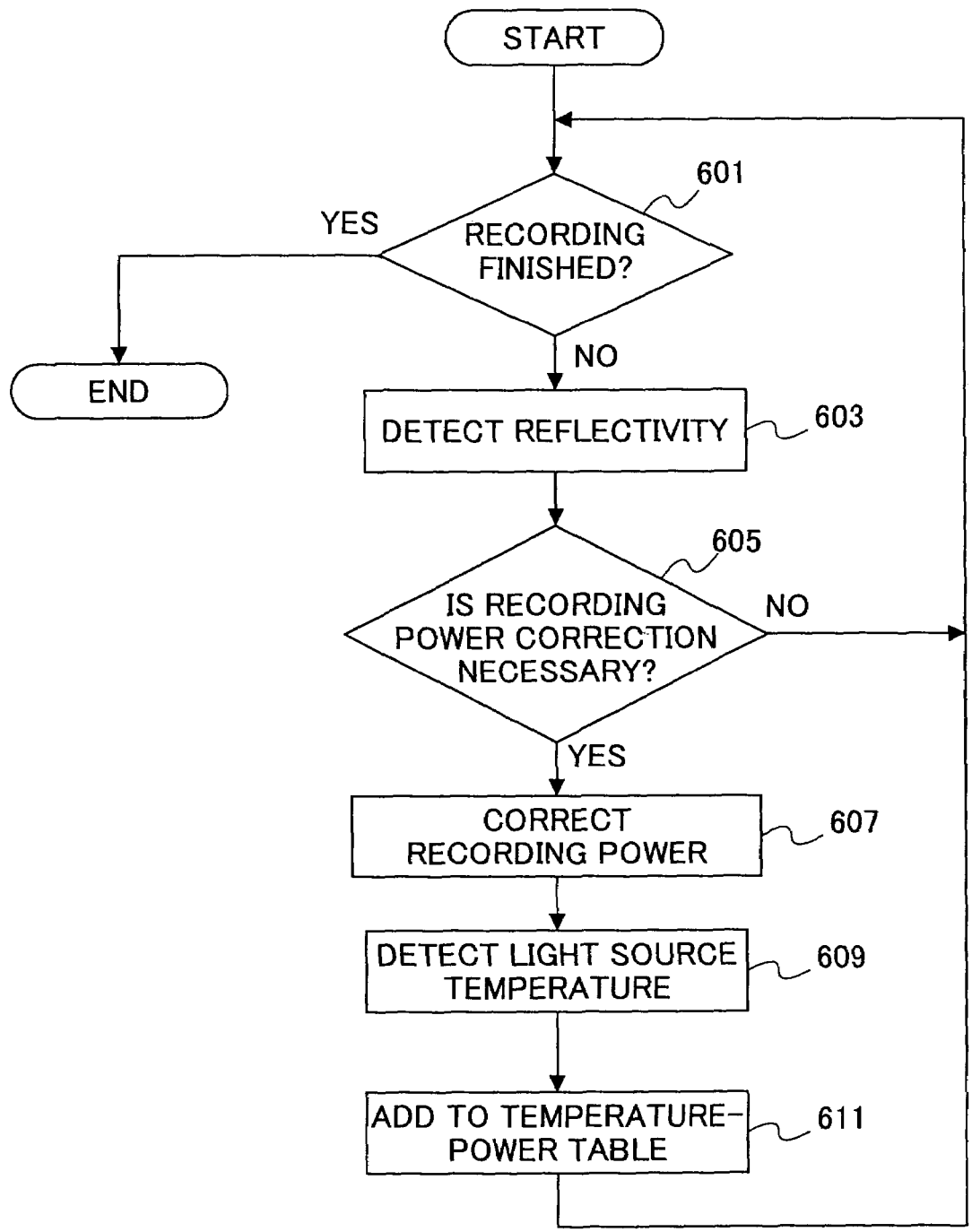
FIG. 8 is a flow chart for explaining a process of setting recording conditions (part 2) according to the second embodiment of the present invention.

In the second embodiment, among the programs stored in the ROM 39, the program serving to perform the steps shown in the flow charts in FIGS. 7 and 8 signifies the second recording condition setting program.

With reference to FIGS. 7 and 8, steps 603, 607 and 609 are included in step a) described in claim 7, step 611 is included in step b) described in claim 7, steps 501 and 503 are included in steps c) and d) described in claim 7, and steps 505, 507 and 509 are included in step e) described in claim 7. Furthermore, steps 521, 523, and 509 are included in steps f) and g) described in claim 8.

Accordingly, as described above, the optical disk apparatus and the recording condition setting method of the second embodiment are also able to set a recording condition by acquiring an optimum recording power corresponding to a detected light source temperature. In the second embodiment, first, a flash memory including history information indicative of optimum recording power and a light source temperature corresponding to the optimum recording power is prepared, in which the optimum recording power and the corresponding light source temperature are stored in the flash memory as history information whenever a recording process is performed. The optimum recording power in this case is obtained by referring to received light reflected from an optical disk during the recording process. Under this condition, before beginning the recording process, a light source temperature is newly detected and is compared with previously detected light source temperatures stored in the flash memory. When the newly detected light source temperature matches with any of the previously detected light source temperatures stored in the flash memory, an optimum recording power corresponding to the newly detected light source temperature can be extracted from the flash memory. Therefore, even when a light source temperature detected before a recording process is different compared to a light source temperature obtained from a previously set recording condition, an optimum recording condition can be newly set without having to use a test-recording area. In addition, since no test-recording is required, the time required for starting a recording process can be shortened. Since a vast amount of history information is stored in the flash memory, there is a high probability of being able to extract from the flash memory a light source temperature matching with the detected light source temperature. Accordingly, recording quality can be prevented from degrading, and a satisfactory recording quality can be obtained consistently.

Furthermore, with the second embodiment, even in a case where a newly detected light source temperature does not match with any of the previously detected light source temperatures stored in the flash memory, an optimum recording power corresponding to the newly detected light source temperature can be estimated and set as a new recording condition by referring to the combinations of the light source temperatures and the optimum recording powers stored in the flash memory. Therefore, even in a case where there is no history information corresponding to a newly detected light source temperature, a highly precise recording power can be acquired.

Furthermore, since the second embodiment stores optimum recording power, light source temperature, and disk ID in a flash memory, no OPC procedure is required to be repeatedly performed in a case, for example, where an optical disk apparatus is switched on after being switched off, or where an optical disk is re-inserted into an optical disk apparatus after being withdrawn therefrom. Thereby, the area for test-recording can be saved.

Furthermore, with the optical disk apparatus of the second embodiment, recording can be performed steadily with excellent recording quality since an optimum recording power corresponding to light source temperature is obtained when setting a recording condition.

Furthermore, with the second embodiment, a relation between a light source temperature and an optimum recording power is obtained whenever a newly detected light source temperature does not match with the previously detected light source temperatures stored in the flash memory. It is, however, not required to obtain the relation whenever a newly detected light source temperature does not match with the previously detected light source temperatures stored in the flash memory. For example, a relation between a light source temperature and an optimum recording power may be obtained beforehand, upon obtaining new history information, and a recording condition may be set in accordance with the relation obtained beforehand. Thereby, process time can be saved.

Furthermore, although an optimum recording power according to reflected light from an optical disk during a recording process and a light source temperature detected during the recording process are stored in the flash memory in the second embodiment, an optimum recording power obtained from an OPC procedure, and a light source temperature during the OPC procedure may also be stored in the flash memory as history information. Accordingly, history information can be enhanced for attaining a more precise recording condition.

Although the second embodiment records the second recording condition setting program in the ROM 39, the program may be recorded in other recording media (e.g. CD-ROM, optic-magneto disk, flash memory, flexible disk). In this case, a drive apparatus corresponding to each recording medium may be provided for allowing the program to be installed from the respective drive apparatus. In other words, it is not required to record the second recording condition setting program in the ROM 39, as long as the program is loaded to the main memory of the CPU 40 for execution.

Although recording power is employed as a recording condition in the above-described embodiments, it is to be noted that the recording condition of the present invention is not to be limited to recording power. For example, the shape of a pulse may be employed as the recording condition of the present invention.

Although a flash memory is employed as a memory unit in the above-described embodiments, an EEPROM, for example, may also be used. That is, any memory unit may be employed as long as the memory unit has a non-volatile characteristic.

Although an optical disk apparatus capable of recording and reproducing information is employed in the above-described embodiments, an optical disk apparatus able to perform at least one function among a recording function, a reproduction function, and an erasing function may be employed.

Although a single light source is employed in the above-described embodiments, plural light sources may also be employed. For example, two light sources comprising a light source emitting a light beam with a wavelength of 650 nm and a light source emitting a light beam with a wavelength of 780 nm may be employed.

As described above, with the recording condition setting method of the present invention, recording quality can be prevented from degrading, and a satisfactory recording quality can be obtained consistently.

Furthermore, with the program and recording medium of the present invention, a computer using the program and recording medium for controlling an information recording apparatus can prevent recording quality from degrading, and obtain a satisfactory recording quality consistently.

Furthermore, with the information recording apparatus of the present invention, an excellent recording quality can be obtained consistently.

Further, the present invention is not limited to these embodiments, but various variations and modifications may be made without departing from the scope of the present invention.

The present application is based on Japanese Priority Application No. 2002-243456 filed on Aug. 23, 2002, with the Japanese Patent Office, the entire contents of which are hereby incorporated by reference.

What is claimed is:

1. A recording condition setting method, comprising the steps of:

a) obtaining identification information from an information recording medium;
b) searching through a table including a plurality of history information corresponding to the identification information of the information recording medium, wherein the history information comprises:
   temperature information detected in the vicinity of a light source and corresponding optimum recording power, that are together stored in the table during an OPC (Optimum Power Control) procedure; and
   temperature information detected in the vicinity of a light source and corresponding optimum recording power according to reflected light from an optical disk during a recording process, that are together stored in the table;
c) extracting history information corresponding to the identification information;
d) detecting temperature information detected in the vicinity of the light source;
e) acquiring an optimum recording power by referring to the temperature information detected in step d) and the history information extracted in step c); and
f) setting the optimum recording power acquired in step e) as a recording condition.

2. The recording condition setting method as claimed in claim 1, further comprising the steps of:
g) determining whether the identification information is recorded in the information recording medium;
h) creating new identification information when the identification information is not recorded in the information recording medium; and
i) recording the new identification information in the information recording medium.

3. The recording condition setting method as claimed in claim 1, wherein step e) further comprises:
obtaining a predetermined expression indicative of a relation between temperature information and optimum recording power with reference to the history information extracted in step c); and
applying the temperature information detected in step d) to the obtained the predetermined expression.

4. The recording condition setting method as claimed in claim 3, wherein the predetermined expression is an approximate expression or an interpolation expression.

5. The recording condition setting method as claimed in claim 1, further comprising the steps of:
j) setting an effective temperature range according to the history information extracted in step c);
k) determining whether the temperature information detected in step d) is included in the effective temperature range;
l) acquiring another optimum recording power by test-recording in the information recording medium when the temperature information detected in step d) is not included in the effective temperature range; and
m) setting the other optimum recording power as the recording condition.

6. The recording condition setting method as claimed in claim 5, further comprising a step of:
n) adding the other optimum recording power to the table in correspondence with the temperature information detected in step d) and the identification information.

7. A recording condition setting method, comprising the steps of:
obtaining identification information from an information recording medium;
a) acquiring an optimum recording power for the information recording medium and temperature information corresponding to the optimum recording power, wherein the optimum recording power is acquired from history information, and wherein the history information comprises:
   temperature information detected in the vicinity of a light source and corresponding optimum recording power, that are together stored in a table during an OPC (Optimum Power Control) procedure; and
   temperature information detected in the vicinity of a light source and corresponding optimum recording power according to reflected light from an optical disk during a recording process, that are together stored in the table;
b) recording the optimum recording power and the temperature information in a memory;
c) detecting temperature information of the information recording medium;
d) determining whether the temperature information of the information recording medium matches the temperature information recorded in the memory; and
e) setting an optimum recording power of the information recording medium as a recording condition when the temperature information of the information recording medium matches the temperature information recorded in the memory.

8. The recording condition setting method as claimed in claim 7, further comprising the steps of:
f) estimating another optimum recording power when the temperature information of the information recording medium does not match with any temperature information recorded in the memory; and
g) setting the other optimum recording power as the recording condition.

9. The recording condition setting method as claimed in claim 8, wherein the other optimum recording power in step f) is estimated by an approximate expression or an interpolation expression with reference to the optimum recording power and the temperature information recorded in the memory.

10. The recording condition setting method as claimed in claim 8, further comprising a step of:
h) adding the other optimum recording power to the memory in correspondence with the temperature information of the information recording medium and identification information of the information recording medium.

11. A recording medium comprising a program having instructions for causing a computer to implement a method comprising the steps of:
a) obtaining identification information from an information recording medium;
b) searching through a table including a plurality of history information corresponding to the identification information of the information recording medium, the history information comprising:
   temperature information detected in the vicinity of a light source and corresponding optimum recording power, that are together stored in the table during an OPC (Optimum Power Control) procedure; and
   temperature information detected in the vicinity of a light source and corresponding optimum recording power according to reflected light from an optical disk during a recording process, that are together stored in the table;

c) extracting history information corresponding to the identification information;

d) detecting temperature information detected in the vicinity of the light source;

e) acquiring an optimum recording power by referring to the temperature information detected in step d) and the history information extracted in step c); and f) setting the optimum recording power acquired in step e) as a recording condition.

12. The recording medium as claimed in claim 11, wherein the instructions for causing a computer to implement a method further comprising the steps of:

g) determining whether the identification information is recorded in the information recording medium;

h) creating new identification information when the identification information is not recorded in the information recording medium; and i) recording the new identification information in the information recording medium.

13. The recording medium as claimed in claim 11, wherein step e) further comprises:

obtaining a predetermined expression indicative of a relation between temperature information and optimum recording power with reference to the history information extracted in step c); and applying the temperature information detected in step d) to the obtained the predetermined expression.

14. The recording medium as claimed in claim 13, wherein the predetermined expression is an approximate expression or an interpolation expression.

15. The recording medium as claimed in claim 11, wherein the instructions for causing a computer to implement a method further comprising the steps of:

j) setting an effective temperature range according to the history information extracted in step c);

k) determining whether the temperature information detected in step d) is included in the effective temperature range;

l) acquiring another optimum recording power by test-recording in the information recording medium when the temperature information detected in step d) is not included in the effective temperature range; and m) setting the other optimum recording power as the recording condition.

16. The recording medium as claimed in claim 15, wherein the instructions for causing a computer to implement a method further comprising a step of:

n) adding the other optimum recording power to the table in correspondence with the temperature information detected in step d) and the identification information.

17. A recording medium comprising a program having instructions for causing a computer to implement a method comprising the steps of:

obtaining manufacturer information from an information recording medium;

a) acquiring an optimum recording power for the information recording medium and temperature information corresponding to the optimum recording power;

b) recording the optimum recording power and the temperature information in a memory;

c) detecting temperature information of the information recording medium, the temperature information comprising:

temperature information corresponding to an optimum recording power detected in the vicinity of a light source during an OPC (Optimum Power Control) procedure; and temperature information detected in the vicinity of a light source, the temperature information corresponding to an optimum recording power according to reflected light from an optical disk during a recording process;

d) determining whether the temperature information of the information recording medium matches the temperature information recorded in the memory; and e) setting an optimum recording power of the information recording medium as a recording condition when the temperature information of the information recording medium matches the temperature information recorded in the memory.

18. The recording medium as claimed in claim 17, wherein the instructions for causing a computer to implement a method further comprising the steps of:

f) estimating another optimum recording power when the temperature information of the information recording medium does not match with any temperature information recorded in the memory; and g) setting the other optimum recording power as the recording condition.

19. The recording medium as claimed in claim 18, wherein the other optimum recording power in step f) is estimated by an approximate calculation or an interpolation calculation with reference to the optimum recording power and the temperature information recorded in the memory.

20. The recording medium as claimed in claim 18, wherein the instructions for causing a computer to implement a method further comprising a step of:

h) adding the other optimum recording power to the memory in correspondence with the temperature information of the information recording medium and manufacturer information of the information recording medium.

21. A recording medium having a program having instructions for causing a computer to implement a method recorded thereto, the program comprising the steps of:

a) obtaining identification information from an information recording medium;

b) searching through a table including a plurality of history information corresponding to the identification information of the information recording medium, each history information including temperature information detected in the vicinity of a light source, corresponding optimum recording power, and recording speed;

c) extracting history information corresponding to the identification information, the history information comprising:

temperature information detected in the vicinity of a light source and corresponding optimum recording power, that are together stored in a table during an OPC (Optimum Power Control) procedure; and temperature information detected in the vicinity of a light source and corresponding optimum recording power according to reflected light from an optical disk during a recording process, that are together stored in the table;

d) detecting temperature information detected in the vicinity of the light source;

e) acquiring an optimum recording power by referring to the temperature information detected in step d) and the history information extracted in step c); and f) setting the optimum recording power acquired in step e) as a recording condition.

22. The recording medium as claimed in claim 21, wherein the instructions for causing a computer to implement a method further comprises the steps of:
- g) determining whether the identification information is recorded in the information recording medium;
- h) creating new identification information when the identification information is not recorded in the information recording medium; and
- i) recording the new identification information in the information recording medium.

23. The recording medium as claimed in claim 21, wherein step e) further comprises:
- obtaining a predetermined expression indicative of a relation between temperature information and optimum recording power with reference to the history information extracted in step c); and
- applying the temperature information detected in step d) to the obtained the predetermined expression.

24. The recording medium as claimed in claim 21, wherein the predetermined expression is an approximate expression or an interpolation expression.

25. The recording medium as claimed in claim 21, wherein the instructions for causing a computer to implement a method further comprises the steps of:
- j) setting an effective temperature range according to the history information extracted in step c);
- k) determining whether the temperature information detected in step d) is included in the effective temperature range;
- l) acquiring another optimum recording power by test-recording in the information recording medium when the temperature information detected in step d) is not included in the effective temperature range; and
- m) setting the other optimum recording power as the recording condition.

26. The recording medium as claimed in claim 21, wherein the instructions for causing a computer to implement a method further comprises the step of:
- n) adding the other optimum recording power to the table in correspondence with the temperature information detected in step d) the identification information, and the recording speed.

27. A recording medium having a program recorded thereto, the program having instructions for causing a computer to implement a method comprising the steps of:
- obtaining identification information from an information recording medium;
- a) acquiring an optimum recording power for the information recording medium and temperature information corresponding to the optimum recording power, wherein the optimum recording power is acquired from history information, and wherein the history information comprises:
  - temperature information detected in the vicinity of a light source and corresponding optimum recording power, that are together stored in a table during an OPC (Optimum Power Control) procedure; and
  - temperature information detected in the vicinity of a light source and corresponding optimum recording power according to reflected light from an optical disk during a recording process, that are together stored in the table;
- b) recording the optimum recording power and the temperature information in a memory;
- c) detecting temperature information of the information recording medium;
- d) determining whether the temperature information of the information recording medium matches the temperature information recorded in the memory; and
- e) setting an optimum recording power of the information recording medium as a recording condition when the temperature information of the information recording medium matches the temperature information recorded in the memory.

28. The recording medium as claimed in claim 27, wherein the instructions for causing a computer to implement a method further comprises the steps of:
- f) estimating another optimum recording power when the temperature information of the information recording medium does not match with any temperature information recorded in the memory; and
- g) setting the other optimum recording power as the recording condition.

29. The recording medium as claimed in claim 28, wherein the other optimum recording power in step f) is estimated by an approximate calculation or an interpolation calculation with reference to the optimum recording power and the temperature information recorded in the memory.

30. The recording medium as claimed in claim 28, wherein the instructions for causing a computer to implement a method further comprises a step of:
- h) adding the other optimum recording power to the memory in correspondence with the temperature information of the information recording medium and identification information of the information recording medium.

31. An information recording apparatus comprising:
- a memory unit storing a table including a plurality of history information corresponding to the identification information of the information recording medium, the history information comprising:
  - temperature information detected in the vicinity of a light source and corresponding optimum recording power, that are together stored in the table during an OPC (Optimum Power Control) procedure; and
  - temperature information detected in the vicinity of a light source and corresponding optimum recording power according to reflected light from an optical disk during a recording process, that are together stored in the table;
- a detecting unit detecting temperature information detected in the vicinity of the light source;
- an obtaining unit obtaining identification information from an information recording medium;
- an extracting unit extracting history information corresponding to the identification information by searching through the table;
- a setting unit acquiring an optimum recording power by referring to the temperature information detected by the detecting unit and the history information extracted by the extracting unit, and setting the acquired optimum recording power as a recording condition; and
- a recording unit recording information in the information recording medium according to the recording condition.

32. The information recording apparatus as claimed in claim 31, further comprising:
- a determining unit determining whether the identification information is recorded in the information recording medium; and
- an identification information recording unit creating new identification information when the identification information is not recorded in the information recording medium, and recording the new identification information in the information recording medium.

33. The information recording apparatus as claimed in claim 31, wherein the setting unit acquires the optimum recording power by:
  obtaining a predetermined expression indicative of a relation between temperature information and optimum recording power with reference to the history information extracted by the extracting unit; and
  applying the detected temperature information to the obtained the predetermined expression.

34. The information recording apparatus as claimed in claim 33, wherein the predetermined expression is an approximate expression or an interpolation expression.

35. The information recording apparatus as claimed in claim 32, further comprising:
  a temperature range setting unit setting an effective temperature range according to the history information extracted by the extracting unit;
  another determining unit determining whether the temperature information detected by the detecting unit is included in the effective temperature range; and
  another setting unit acquiring another optimum recording power by test-recording in the information recording medium when the temperature information detected by the detecting unit is not included in the effective temperature range, and setting the other optimum recording power as the recording condition.

36. The information recording apparatus as claimed in claim 35, wherein the other setting unit adds the other optimum recording power to the table in correspondence with the temperature information detected by the detecting unit and the identification information.

37. The information recording apparatus as claimed in claim 31, wherein the memory unit is a memory having a non-volatile characteristic.

38. An information recording apparatus comprising:
  an acquiring unit acquiring identification information from an information recording medium, an optimum recording power for the information recording medium, and temperature information corresponding to the optimum recording power, wherein the acquiring unit searches through history information that comprises:
  temperature information detected in the vicinity of a light source and corresponding optimum recording power, that are together stored in a table during an OPC (Optimum Power Control) procedure; and
  temperature information detected in the vicinity of a light source and corresponding optimum recording power according to reflected light from an optical disk during a recording process, that are together stored in the table;
  a recording unit recording the optimum recording power and the temperature information in a memory unit;
  a detecting unit detecting temperature information of the information recording medium;
  a determining unit determining whether the temperature information of the information recording medium matches the temperature information recorded in the memory unit; and
  a setting unit setting an optimum recording power of the information recording medium as a recording condition when the temperature information of the information recording medium matches the temperature information recorded in the memory unit.

39. The information recording apparatus as claimed in claim 38, further comprising another setting unit estimating another optimum recording power when the temperature information temperature information of the information recording medium does not match any temperature information recorded in the memory unit, and setting the other optimum recording power as the recording condition.

40. The information recording apparatus as claimed in claim 39, wherein the other optimum recording power is estimated by an approximate calculation or an interpolation calculation with reference to the optimum recording power and the temperature information recorded in the memory unit.

41. The information recording apparatus as claimed in claim 39, wherein the recording unit adds the other optimum recording power to the memory unit in correspondence with the temperature information of the information recording medium and identification information of the information recording medium.

42. The information recording apparatus as claimed in claim 38, wherein the memory unit is a memory having a non-volatile characteristic.

* * * * *

UNITED STATES PATENT AND TRADEMARK OFFICE
CERTIFICATE OF CORRECTION

PATENT NO. : 7,639,575 B2
APPLICATION NO. : 10/641067
DATED : December 29, 2009
INVENTOR(S) : Suzuki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 767 days.

Signed and Sealed this

Twenty-first Day of December, 2010

David J. Kappos
*Director of the United States Patent and Trademark Office*